March 17, 1970  F. W. BROCKER  3,501,248
VARIABLE DIAMETER PROPELLERS
Filed May 14, 1968  2 Sheets-Sheet 1
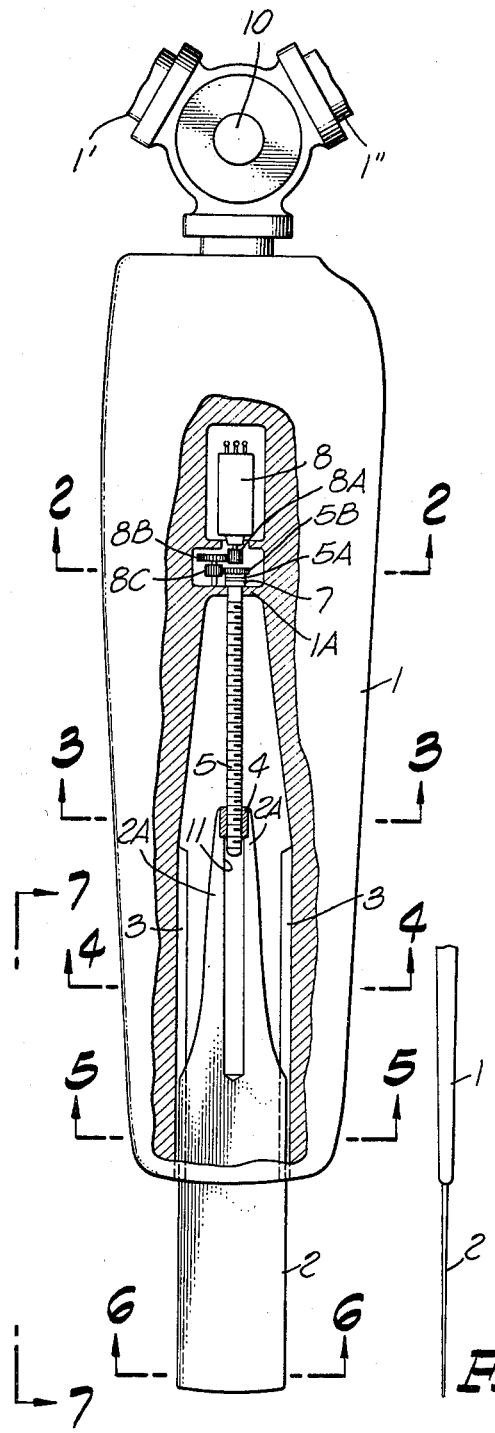
INVENTOR.
FRIEDRICH W. BROCKER
BY
Lyon & Lyon
ATTORNEYS

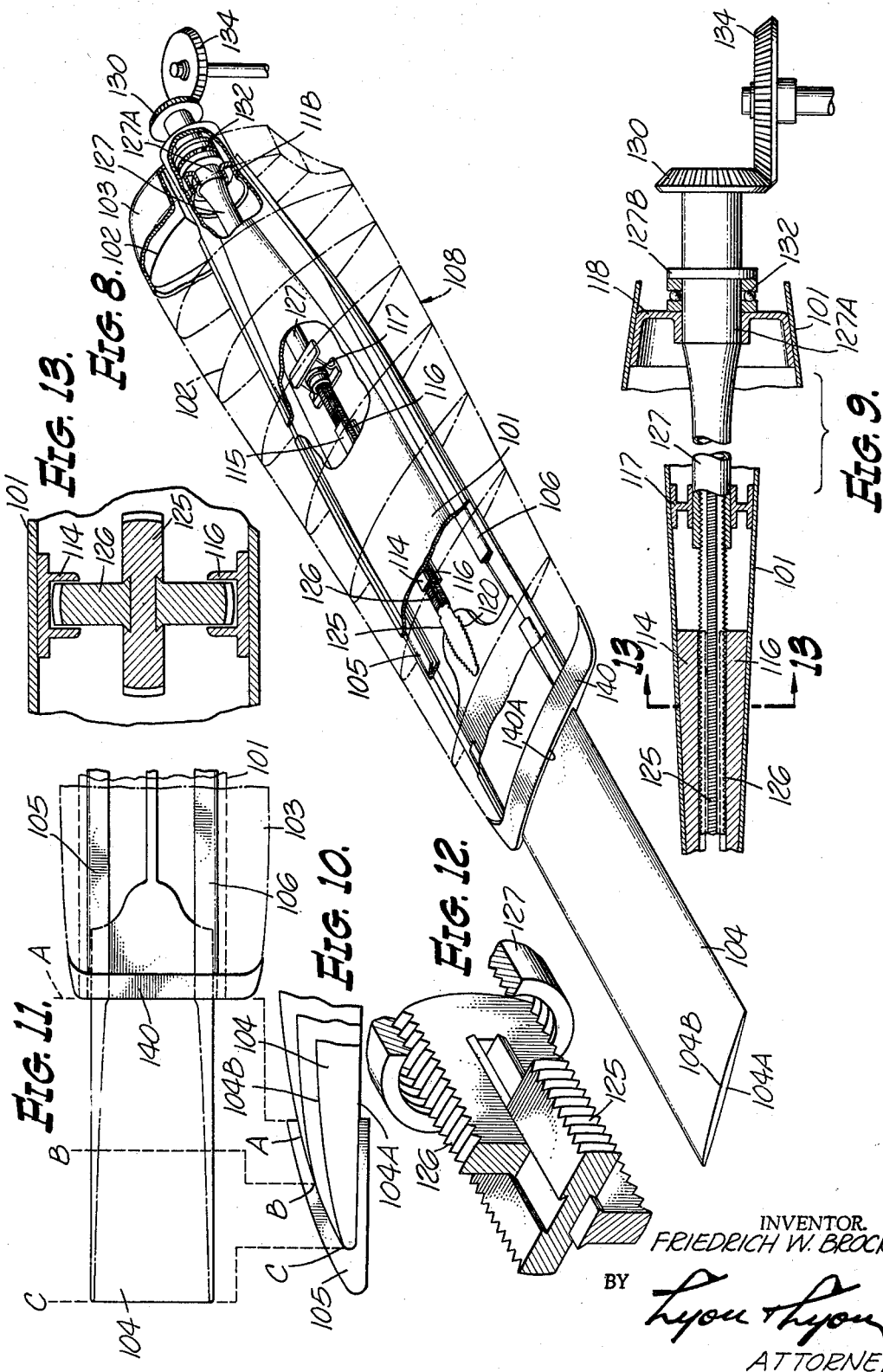

United States Patent Office 3,501,248
Patented Mar. 17, 1970

3,501,248
VARIABLE DIAMETER PROPELLERS
Friedrich W. Brocker, 39147 N. 11th St. W.,
Palmdale, Calif. 90355
Filed May 14, 1968, Ser. No. 729,029
Claims priority, application Germany, May 17, 1967,
1,506,623
Int. Cl. B64c 27/72
U.S. Cl. 416—89                                15 Claims

ABSTRACT OF THE DISCLOSURE

A variable diameter propeller for cruising and hovering has an outer section mounted for guided movement within an inner section by a mechanism inside said inner section. Such outer section has a flat profile and is of substantially constant width along its length and contacts its guides only at its leading and trailing edge portions. Also there is progressively larger contact area between the sections when and as the outer section is extended to thereby provide increased structural stability and integrity. The actuating mechanism involves an elongated threaded member cooperating with a nut member, the elongated threaded member being of two parts for assembly and disassembly purposes.

---

I claim priority under 35 U.S.C. 19 based on the filing of a German patent application on May 17, 1967.

The present invention relates to improved variable diameter propellers which are useful, for example, in short take-off aircraft and in particular in vertical take-off and landing operations in that type of aircraft sometimes referred to as V/STOL.

An object of the present invention is to provide new concepts useful in the production of improved variable diameter propellers which are thus capable of increasing, in considerable amount, the payload capability for vertical take-off and landing operations Another object of the present invention is to provide an improved variable diameter propeller which is particularly useful in V/STOL aircraft for achieving an increase in hover ceiling.

Another object of the present invention is to provide an improved variable diameter propeller which is particularly useful in V/STOL aircraft and is particularly useful in improving cruise performance such that the payload may be increased as a result of minimizing of fuel requirements.

Another object of the present invention is to provide an improved variable diameter propeller of this character which has a relatively small noise level particularly in the hover phase.

A specific object of the present invention is to provide an improved variable diameter propeller of this character which may be adjusted in diameter to achieve improved efficiencies in both cruising and in hovering.

Another specific object of the present invention is to provide an improved variable diameter propeller which may be made large in diameter for increased payload capability, lower noise level, and enhanced payload capabilities in vertical operations at high elevations, and yet which may be adjusted for smaller diameter for increased efficiency in cruising operations.

Another specific object of the present invention is to provide new teachings and concepts which are useful in the production of improved variable diameter propellers which provide reduction in take-off distance and/or increase in take-off weight.

Another specific object of the present invention is to provide an improved variable diameter propeller in which there is relatively little detrimental aerodynamic effect on thrust due to the discontinuity in blade shape.

Another specific object of the present invention is to provide an improved variable diameter propeller which minimizes aerodynamic losses due to greater than normal airfoil thickness ratios on the blade tip which might be necessary for space to stow and retain the proposed extension.

Another specific object of the present invention is to provide an improved variable diameter propeller which minimizes structural difficulties in general, specially for the reliability of the extension mechanism.

Another specific object of the present invention is to proivde an improved variable diameter propeller of this character in which aerodynamic losses due to discontinuity between relatively movable sections of the propeller are relatively small compared with the thrust increase.

Another object of the present invention is to provide an improved variable diameter propeller in which the movable outer propeller section is of substantially constant width along its length with only the leading and trailing edges thereof being engaged by guides within the inner propeller section.

Another specific object of the present invention is to provide an improved variable diameter propeller which allows a changing airfoil section along its length.

Another specific object of the present invention is to provide an improved variable diameter propeller in which an outer movable propeller section has very little limitation placed on its profile, either in the aerodynamic or structural sense.

Another specific object of the present invention is to provide an improved variable diameter propeller in which the contact surface between an outer blade section and an inner blade section changes with extension of the outer blade section and in accordance with load to be transferred such that the largest contact surface exists when the outer section is fully extended and the smallest surface is contacted when the outer blade section is fully retracted.

Another specific object of the present invention is to provide an improved variable diameter propeller in which a special guide structure may be provided to cooperate with the leading and trailing blade edges of the propeller extension and more specifically such that a spiral guide structure may be incorporated.

Another specific object of the present invention is to provide an improved variable diameter propeller construction in which the inner stationary section and outer movable section each has a profile whose line of reference is such that they need not coincide with each other.

Another specific object of the present invention is to provide an improved variable diameter propeller having an outer movable section in which the twist distribution of the outer section along its length may differ from the twist distribution of the inner section thereby allowing additional freedom in design for aerodynamic propeller optimization.

Another specific object of the present invention is to provide an improved variable diameter propeller having an improved actuating mechanism.

Another specific object of the present invention is to provide an improved variable diameter propeller in which individual parts may be readily assembled and disassembled.

Another object of the present invention is to provide an improved actuating mechanism with a mass distribution such that the major large portions thereof are relatively close to the rotational axis to thereby allow proper dimensioning according to stress distribution along its length.

Another object of the present invention is to provide an improved actuating mechanism involving an elongated element which cooperates with a structure having a dual function, namely that of preventing rotation of said element as well as preventing its vibration.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates one form of the present invention and is a view in elevation with a portion of the inner blade section broken away.

FIGURES 2, 3, 4, 5 and 6 are sectional views taken as indicated by the corresponding lines 2—2, 3—3, 4—4, 5—5, and 6—6 in FIGURE 1.

FIGURE 7 is a view in side elevation taken as indicated by the lines 7—7 in FIGURE 1.

FIGURE 8 is a generally perspective view illustrating another form of the present invention with some parts broken away to show internal construction.

FIGURE 9 is a sectional view taken substantially as indicated by lines 9—9 in FIGURE 8.

FIGURE 10 is a sectional view taken substantially as indicated by line 10—10 in FIGURE 8.

FIGURE 11 is a top plan view of some of the structure shown in FIG. 8 for purposes of illustrating the changing contact area.

FIGURE 12 is a perspective view of a portion of the elongated screw structure and the cooperating internally threaded sleeve.

FIGURE 13 is a section taken substantially on line 13—13 of FIGURE 9.

Referring to the form of invention shown in FIGURES 1–7 the same includes an inner blade section 1 and an outer section 2 which is slidably mounted in a pair of guides 3 internally in and on such inner blade section 1. The blade section 1 is supported like two other blades 1' and 1" on a motor-driven shaft 10 to thereby provide a three propeller blade construction.

The outer blade section 2 is formed with a tapered inner section 2A and an open-ended slot 11 is formed in the same to accommodate an elongated screw 5 which is threaded in a nut member 4 on such tapered section 2A. This screw member 5 is rotatably supported on the inner blade section 1 and is driven by a synchro unit 8 through a gear train. The end of the screw member 5 may be provided with a flange 5A and a thrust bearing 7 may be interposed between the flange 5A and the wall portion 1A of blade 1. Such screw member 5 may also mount a gear 5B which is driven by the gear 8A on the synchro shaft through intermediate gears 8B and 8C.

The synchro unit 8 in the form of an electric motor which when energized causes the screw member 5 to be rotated to thereby cause the outer blade section 2 to be moved inwardly or outwardly depending upon the direction of rotation of the synchro unit 8.

It will be seen that the outer portion of the outer blade section 2 is of constant width along its length and that the cooperating pair of guides 3 thus extend substantially parallel in FIGURE 1. It will also be seen that the outer blade member 2 is engaged, as shown in FIGURE 5, by the inner blade member 1 only at the leading and trailing edge portions of such blade section 2 with sufficient clearance existing as indicated at 14 and 15 in FIGURE 5 between intermediate portions of the blade section 2 and the adjacent portions of the inner blade section 1.

It will further be seen in FIGURES 5 and 6 that the profile of the outer blade section 2 is, for example, defined by a generally flat surface portion 2B and a generally convex portion 2C and that the area of such profile increases in a direction extending inwardly from the tip end of the blade section 2.

In the arrangement shown in FIGURE 8 the outer blade section 104 is guided for movement in generally parallel extending guides 105, 106. In some forms of the invention the outer blade section 104 may have a twist distribution extending along its length in which case the leading and trailing edges of such section 104 lie on a general spiral line extending inwardly from the tip and accordingly the guides 105, 106 are then of corresponding spiral shape to receive and guide such section 104 when and as the same is being retracted or extended within the inner thin walled and hollow chamber 101 of the inner propeller blade section 108 which is defined by an outer skin 103 filled with light weight filler material 102. The filler material 102 is disposed between the outer surface of chamber 101 and the inner surface of outer skin 103.

The chamber 101 may be of one-piece construction or may be two complementary shells welded or brazed together and has internally mounted thereof the previously mentioned pair of guides 105, 106 as well as a pair of guides 114, 116, a bearing 117, and a bearing 118.

The outer blade 104, which may, for example, be of metal is connected through a pine-tree type of connection 120 to one end of a generally flat screw member 125, the pine-tree connection allowing some rotation of the blade 104 about the axis of the screw member 125 but preventing any movement along the axis of such screw member 125. A like complementary screw member 126 having matching screw threads is joined as by a releasable tongue and groove type connection to the other screw member 125 and such screw member 126 cooperates with the previously mentioned spaced guides 114, 116. This composite screw member 125, 126 is threaded within the internally threaded tube 127 which has an enlarged diameter portion 127A that mounts a thrust flange 127B and a planetary bevel gear 130.

It will be seen that the reduced diameter portion of the tube 127 extends through the bearing member 117 and also the enlarged diameter portion 127A extends through the inner cylindrical portion of the bearing member 118 so that such tube is supported for rotation at two spaced locations. A thrust bearing 132 is positioned between an outer flat surface of the bearing member 118 and the flange 127B. The planetary bevel gear 130 may be driven, like the other propeller blade constructions of the same composite propeller, by a sun gear 134 such that in all cases the corresponding planetary gears 130 move in synchronism.

It will be seen that when and as the tube or spindle 127 is rotated the composite screw member 125, 126 is moved longitudinally to move the outer blade member 104 in its spaced guides 105, 106. Here again the blade 104 is engaged only at its leading and trailing edge portions. It will also be seen that the outer blade section 104 has a flat profile defined by a generally flat surface 104A and an arcuate surface 104B and that the area of the blade profile section increases in the direction away from the tip of the blade 104. It will further be seen in FIGURES 10 and 11 that the contact length between the blade section 104 and its guides 105, 106 increases progressively as the blade is extended, there being a maximum contacting length in the extended position indicated at A in FIGS. 10 and 11 and a minimum contacting length in the retracted position indicated at C in FIGS. 10 and 11 and an intermediate contact length at B in FIGS. 10 and 11. It will also be noted that the width of the blade 104 is substantially constant throughout its length and therefore the guides 105, 106 may extend parallel, with however some spiral twist in the same, in those cases where the blade section 104 has a twist distribution extending from its tip to its inner portion to thereby conform in width and twist distribution in all cases to the leading and trailing edges of the outer blade. Because the outer blade section 104 is engaged only at its leading and trailing edges, there is considerable latitude in design in that the profile and/or area may change along the length of the blade independently of the profile of the inner blade section 108.

It will be seen that this construction allows convenient assembly and disassembly. For example, when it is desired to disassemble parts, the tubular nut 127 is turned until the screw threads on the screw member 125 are disengaged but yet with the screw threads on the screw member 126 being engaged. When this condition exists the blade 104 may be pulled outwardly and the internally threaded spindle 127 may be pulled inwardly through the spaced stationary bearings 117 and 118 carrying with it the thrust washer 132 and the screw section 126. The mode of assembly is obvious from the foregoing description in which case the thrust bearing 132 is placed on the enlarged diameter portion 127A of the threaded spindle 127 and the portion of smaller diameter is inserted through the aligned bearings 117 and 118. The blade 104 with the screw member 125 thereon is inserted through the other end of the chamber 101 into the guides 105, 106 and the spindle 127 is turned to cause engagement of the screw threads on the screw member 125 with the internal threads of spindle 127.

Preferably the chamber 101 is formed at one of its ends to receive a reenforcing cap 140 which is permenently affixed to the ends of the thin walled elements defining such chamber 101. The opening in such cap 140 is preferably such that in the fully extended position of blade section 104, not only are the leading and trailing edges engaged as illustrated at A in FIGS. 10 and 11 but also the intermediate portion of the blade 104 is contacted by the inner wall 140A defining the opening in cap 140 to thereby increase the structural stability.

I claim:

1. In a variable diameter propeller construction wherein an outer blade section having a leading edge portion and a trailing edge portion moves within an inner blade section, a guide structure on said inner blade section, and said outer blade section contacting said guide structure only at the leading and trailing edge portions of said outer blade section, said outer blade section having a twist distribution along its length and said guide structure having a like complementary spiral twist in the same in those regions where said guide structure contacts said leading and trailing edge portions.

2. A propeller construction as set forth in claim 1 in which said guide structure includes two generally parallel extending guide members, and said outer blade section is of substantially the same width throughout the length thereof contacted by said guide members.

3. A variable diameter propeller construction as set forth in claim 1 in which screw threaded operating means are mounted in said inner blade section and are controlled to extend and retract said outer blade section.

4. A blade construction as set forth in claim 1 wherein the contact length between said outer blade section and said guide measured in a direction transverse to the longitudinal axis of the blade is progressively increased when and as said outer blade section is moved from a retracted position to an extended position.

5. A blade construction as set forth in claim 1 in which said outer blade section has a flat profile.

6. A blade construction as set forth in claim 1 in which said inner blade section also has a twist distribution along its length.

7. A variable diameter propeller construction as set forth in claim 1 in which the airfoil sections of said outer blade section are progresively of larger area in a direction extending inwardly from the tip thereof.

8. A propeller construction as set forth in claim 6 in which the lines of reference of the profiles of the inner and outer blade sections are non-coincident.

9. A propeller as set forth in claim 1 including a threaded rod structure having one of its ends attached to said outer blade section, a nut structure attached to said inner blade section, said threaded rod structure comprising two releasably connected threaded sections which are normally engaged by said nut structure, one of said threaded rod sections being attached to said outer blade section and the other one of said threaded rod sections being, in one extreme position thereof, maintained in threaded engagement with said nut structure without said nut structure engaging said one threaded section so that said two threaded sections may be moved relative to each other.

10. A propeller as set forth in claim 9 in which said one threaded section is attached to said outer blade section by a connection which allows the outer blade section to pivot about the axis of said rod structure but prevents longitudinal movement of said outer blade section with respect to said one threaded rod structure.

11. A propeller as set forth in claim 9 in which said nut structure comprises an internally threaded tube which may be withdrawn through spaced bearings on said inner blade structure.

12. A propeller as set forth in claim 9 in which said inner blade structure carries guide members engageable with said other threaded rod section to prevent rotational movement of said threaded rod and also to prevent vibration.

13. A propeller as set forth in claim 9 in which said one threaded rod section is generally flat and small enough to be withdrawn through an opening in said inner blade section for detachment from said inner blade section.

14. A propeller as set forth in claim 1 in which said outer blade section, in its fully extended position, also has a portion thereof intermediate said edges engaging said inner blade section.

15. A propeller as set forth in claim 14 in which a complete peripheral portion of said outer blade section contacts said inner blade section.

References Cited

UNITED STATES PATENTS

| | | | |
|---|---|---|---|
| 2,145,413 | 1/1939 | Belfield | 170—160.11 |
| 2,163,482 | 6/1939 | Cameron | 170—160.11 |
| 2,464,285 | 3/1949 | Andrews | 170—160.11 X |
| 2,713,393 | 7/1955 | Isacco | 170—160.11 |
| 3,249,160 | 5/1966 | Messerschmitt | 170—160.11 |

FOREIGN PATENTS 732,051  2/1943  Germany.

EVERETTE A. POWELL, JR., Primary Examiner